F. G. KOEHLER.
TRUCK BEARING.
APPLICATION FILED MAR. 16, 1916.
1,226,894. Patented May 22, 1917.
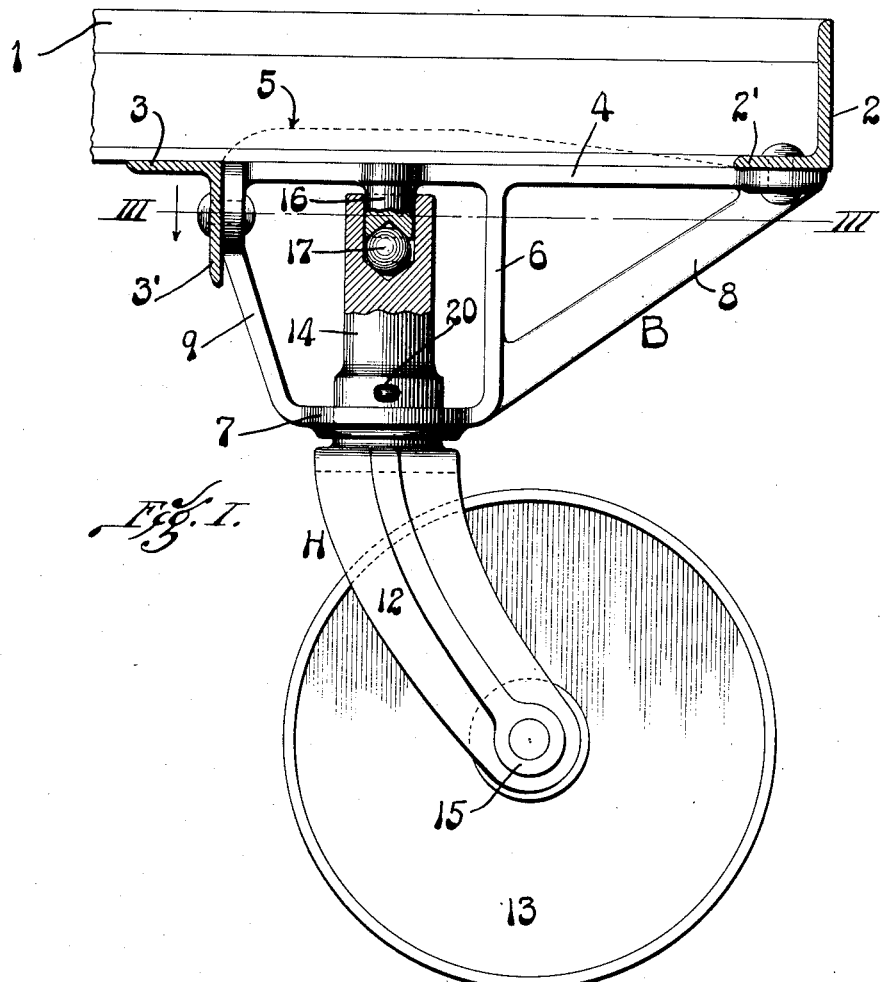
Fig. I.
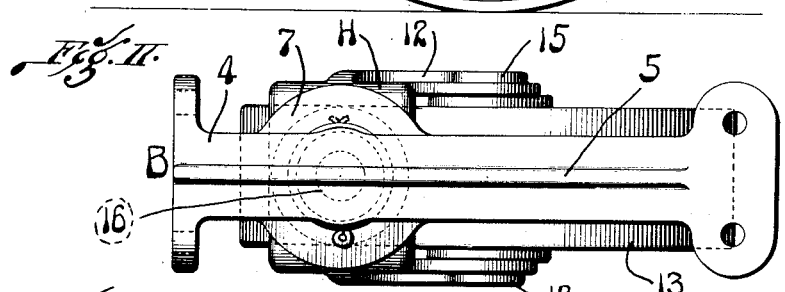
Fig. II.
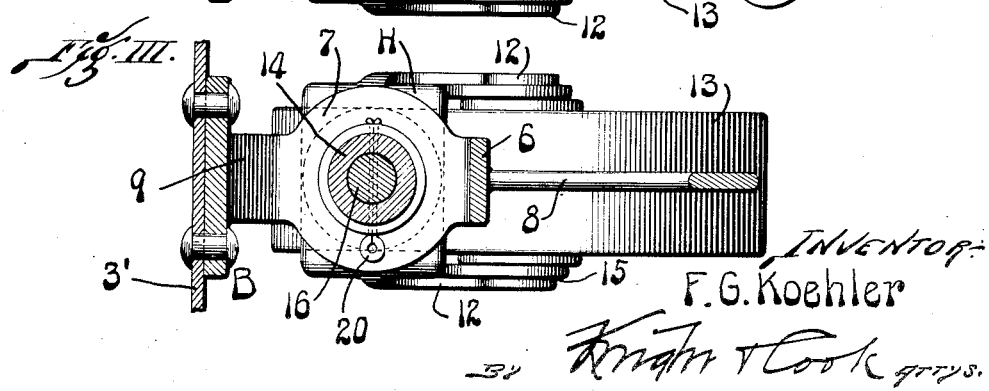
Fig. III.
INVENTOR:
F. G. Koehler
By Knight & Cook, attys.

UNITED STATES PATENT OFFICE.

FRANK G. KOEHLER, OF ST. LOUIS, MISSOURI.

TRUCK-BEARING.

1,226,894. Specification of Letters Patent. Patented May 22, 1917.

Application filed March 16, 1916. Serial No. 84,604.

*To all whom it may concern:*

Be it known that I, FRANK G. KOEHLER, a citizen of the United States of America, a resident of the city of St. Louis, State of Missouri, have invented certain new and useful Improvements in Truck-Bearings, of which the following is a full, clear, and exact description, reference being had to the accompanying drawings, forming a part of this specification.

My invention relates to improvements in truck bearings particularly adapted for use on large trucks of the type used in handling freight and baggage. One of the objects of the invention is to produce a strong and simple truck bearing adapted to receive a wheel holder having a vertical stem. The preferred form of the invention includes a bearing frame having a lower bearing through which the vertical stem of the wheel holder extends, and a thrust bearing for the upper end of the stem. The load is preferably supported by the thrust bearing, the stresses caused by the load being transmitted downwardly through the stem and to the wheel. The shocks occurring when the wheel strikes an obstruction are transmitted from the rotatable stem to the lower bearing and from thence to the upper portion of the bearing frame. This frame is preferably provided with inclined thrust arms for the transmission of stresses from the lower bearing to the upper portion of the frame.

Figure I is a side elevation partly in section, illustrating a portion of a truck provided with a bearing frame and wheel holder embodying the features of the invention.

Fig. II is a top or plan view of the bearing frame and wheel holder.

Fig. III is a horizontal section on line III—III, Fig. I.

The truck frame shown in Fig. I is provided with a longitudinal sill 1, an end sill 2 having a horizontal flange 2' and a transverse member 3 having a vertical flange 3'.

B designates a bearing frame, preferably a single casting, provided with a horizontal upper member 4 having a central reinforcing rib 5, a vertical brace member 6 extending downwardly from said upper member to a lower bearing member 7, and inclined front and rear thrust arms 8 and 9 extending upwardly from said bearing member 7 to provide for the transmission of stresses to the upper portion of the bearing frame.

The horizontal flange 2' of the end sill 2 is seated on and riveted to an end portion of the member 4 at a point above the inclined thrust arm 8. The upper portion of the thrust arm 9 is riveted to the vertical flange 3' of the transverse member 3.

H designates a wheel holder in the form of a fork having a pair of legs 12 which straddle the wheel 13, and a vertical stem 14 extending upwardly from the upper ends of said legs. Bearings 15 are formed at the lower ends of the legs 12 to receive the shaft or journals at opposite sides of the wheel 13. The stem 14 extends through the lower bearing 7 and it is free to rotate in said bearing. A thrust bearing, located above the lower bearing 7, comprises a circular thrust member 16 in the form of a pin extending downwardly from the frame member 4 and telescoped with the upper end of the stem 14, and an antifriction ball 17 located between the lower end of said thrust member 16 and a portion of the stem 14. The upper end of the stem is provided with a pocket for the reception of the ball 17 and the circular thrust member 16. It will be noted that the upper end of the stem is interlocked with the circular thrust member 16 and that the axis of each of said parts coincides with the axis of the lower bearing 7. The vertical stem 14 is fitted to the upper and lower bearings so that the wheel holder H will turn freely in the bearing frame.

20 designates a cotter pin passing through the stem 14 at a point above the lower bearing 7, so as to serve as means for detachably securing the wheel holder to the bearing frame. Obviously, the wheel holder may be very easily removed from the bearing frame by removing the cotter pin 20 and then withdrawing the stem 14 through the lower bearing 7.

The stresses due to the weight of the truck and its load are transmitted through the circular thrust member 16, ball 17 and stem 14 without causing any appreciable stresses at the lower bearing 7, and without causing undue friction at the different bearings. The shocks occurring when the wheel strikes an obstruction are transmitted from the vertical stem 14 to the lower bearing 7 and through one of the diagonal thrust arms 8 or 9 to the upper portion of the bearing frame. Shocks of this kind subject the vertical stem 14 to a shearing strain at the lower bearing 7, but they do not cause any injurious strains at the upper bearing elements 16 and 17.

The bearing elements 16 and 17 may be lubricated by placing oil or grease in the pocket at the upper end of stem 14, and this pocket is well adapted to retain the lubricant at the friction surfaces for a very long period of time.

I claim:—

1. A device of the character described comprising a wheel holder, a wheel carried by said wheel holder, a stem extending upwardly from said wheel holder, a bearing frame having a lower bearing through which said stem extends and a downwardly extending thrust member at a point above said lower bearing, the upper end of said stem being provided with a pocket for the reception of said thrust member, and said stem being rotatably fitted to said lower bearing and thrust member, and a ball arranged in said pocket between the lower end of said thrust member and a portion of said stem, both of the last mentioned parts being fitted to said ball.

2. A device of the character described comprising a wheel holder, a wheel carried by said wheel holder, a stem extending upwardly from said wheel holder, and a bearing device having a lower bearing through which said stem extends and a downwardly extending thrust pin at a point above said lower bearing, the upper end of said stem being provided with a pocket for the reception of said downwardly extending thrust pin, and said stem being rotatably fitted to said lower bearing and thrust pin.

3. A device of the character described comprising a wheel holder, a wheel carried by said wheel holder, a stem extending upwardly from said wheel holder; and a bearing frame having an upper frame member provided with a thrust bearing, a lower bearing member below said upper frame member, said stem being rotatably fitted to said lower bearing member and thrust bearing, and thrust arms extending upwardly from opposite sides of said lower bearing member to the upper frame member to provide for the transmission of stresses to said upper frame member.

4. A device of the character described comprising a wheel holder, a wheel carried by said wheel holder, a stem extending upwardly from said wheel holder; and a bearing frame in the form of a single casting having an upper frame member provided with a thrust bearing, a lower bearing member below said upper frame member, said stem being rotatably fitted to said lower bearing member and thrust bearing, a front thrust arm extending upwardly from the front of said lower bearing member to said upper frame member, and a rear thrust arm extending upwardly from the rear of said lower bearing member to said upper frame member, said thrust arms being formed integral with said lower bearing member and upper frame member.

FRANK G. KOEHLER.